Figure 1:
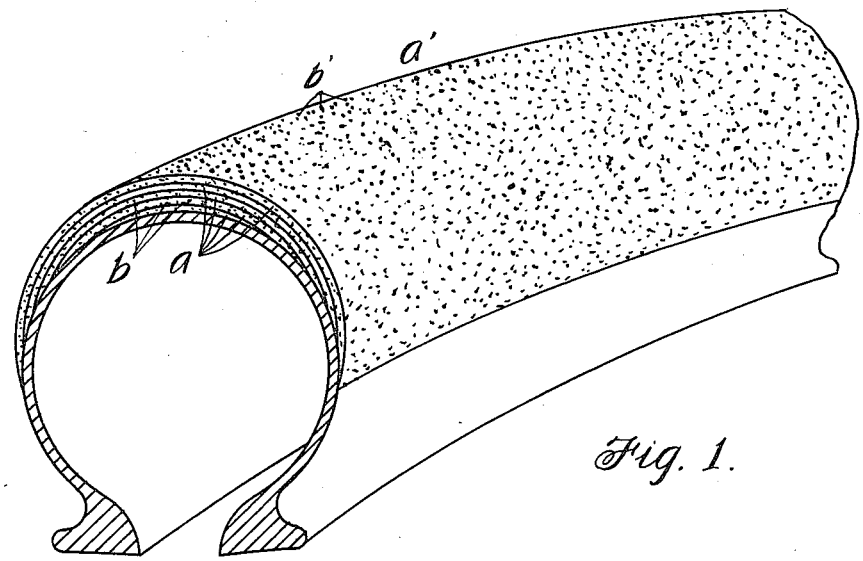

J. H. FAWKES.
ARTICLE OF MANUFACTURE FOR TIRES AND OTHER PURPOSES.
APPLICATION FILED MAR. 5, 1915.

1,175,624.

Patented Mar. 14, 1916.

WITNESSES.

INVENTOR
Jacob H. Fawkes.
BY
ATTORNEY

UNITED STATES PATENT OFFICE.

JACOB H. FAWKES, OF PORTLAND, OREGON.

ARTICLE OF MANUFACTURE FOR TIRES AND OTHER PURPOSES.

1,175,624.

Specification of Letters Patent.  Patented Mar. 14, 1916.

Application filed March 5, 1915. Serial No. 12,420.

*To all whom it may concern:*

Be it known that I, JACOB H. FAWKES, a citizen of the United States, and a resident of Portland, county of Multnomah, and State of Oregon, have invented a new Article of Manufacture for Tires and other Purposes, of which the following is a specification.

My invention relates more particularly to the manufacture of tires of vehicles and the heels and soles of shoes, horseshoes and the like, but it has besides many other uses as will be self-evident.

The object of my invention is to provide a fabric which will not slip on wet street pavements of the bithulithic class, and other smooth face composition pavement.

To this end, my new article of manufacture consists of material or fabric preferably composed of unvulcanized rubber, or material composed in more-or-less of rubber, having distributed throughout its body particles, preferably of granular form, of metal, preferably aluminum. The whole mass is united by a suitable process, for example, by being vulcanized into a homogeneous substance. The particles of metal will be distributed on the surface of the manufacture, and by reason of the difference in the hardness of the material of which such surface is composed, and the metal particles being non-yielding and the rest of the surface being yielding, the tread of the material will always present a roughened non-slipping surface; the metal particles not having a tendency to slip, but offering to the contrary great frictional resistance, acting similar to sand and grit interposed between two surfaces that are to be prevented from slipping one on the other. Furthermore, aluminum is very light and does not corrode rubber. The advantages of such use, therefore, are apparent.

In carrying my invention into practice, I have found it convenient to make my article as hereinafter described and illustrated in the accompanying drawings, constituting a part of this specification.

The figures shown in the drawings are in diagrammatic form.

Figure 2:
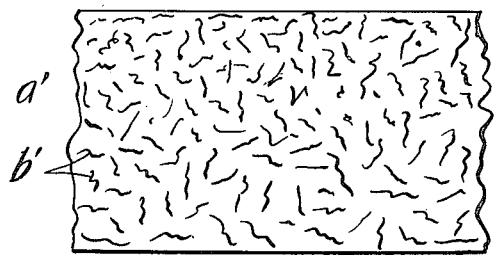
Figure 3:
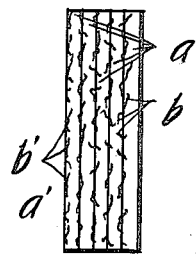
Figure 4:
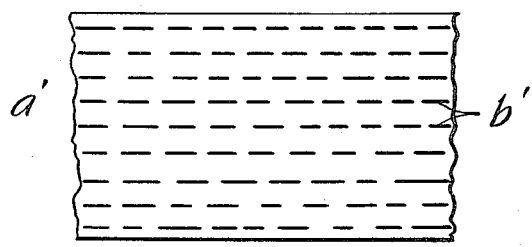

Figure 1 is a diagrammatic perspective view of a portion of an automobile tire, the tread of which is made of the material comprising my invention. In this form of my invention, the particles of metal are granular in form. Fig. 2 is a plan view of a strip of the material in which the particles of metal are of different form than that shown in Fig. 1. Fig. 3 is an end elevation of Fig. 2, and Fig. 4 is a view similar to Fig. 2, showing, however, the metal particles distributed in a fibrous or thread-like form throughout the material.

A description of the mode of making the manufacture illustrated in Fig. 2 will be sufficient for the general understanding of my invention.

The layers $a$ are composed of unvulcanized rubber or fabric composed in the greater part of rubber, and between the layers are sprinkled granular particles of metal $b$. The layers are then firmly compressed upon each other and vulcanized. Such treatment causes the granular particles of metal to be pressed up through the layers, appearing on the wearing face as shown by $b'$, in the wear surface $a'$ as shown in Fig. 1. There is thus distributed throughout the wear face, particles of metal which, as already mentioned, offer increased frictional contact with the surface upon which the wear face $a'$ bears; and thus, as self-evident, my new article of manufacture is especially adapted for making tires of automobiles and the heels and soles of shoes, and fillers for horseshoes.

Instead of using granular particles of metal, thread like particles may be used as illustrated in Fig. 3, in which $a'$ represents the wear surface and $b^2$ the thread-like particles of metal. But I prefer to use granular particles.

Another way in which my article of manufacture may be made is as follows: Take rubber cut into pieces and dissolve in a suitable solvent, then add one twentieth by weight of granular aluminum; then mix the mass, allow the solvent to evaporate, and finally work up into the form desired.

I claim:

1. A new article of manufacture consisting of layers of material consisting in whole or part of rubber, and granular particles of aluminum distributed between the layers of the fabric, the layers being compressed together and the whole being vulcanized into a homogeneous mass.

2. A new article of manufacture consisting of layers of material and granular particles of aluminum distributed between the layers of the fabric, the layers being compressed together and united into a homogeneous mass.

JACOB H. FAWKES.

Witnesses:
WM. C. SCHMITT,
D. E. CRABB.